United States Patent
Heinla et al.

(10) Patent No.: US 7,480,658 B2
(45) Date of Patent: Jan. 20, 2009

(54) DISTRIBUTED DATABASE SYSTEM AND METHOD HAVING NODES CO-ORDINATED IN A DECENTRALIZED MANNER

(75) Inventors: Ahti Heinla, Tallinn (EE); Priit Kasesalu, Tallinn (EE)

(73) Assignee: Joltid LTD., Tortola (VG)

( * ) Notice: Subject to any disclaimer, the term of this patent is extended or adjusted under 35 U.S.C. 154(b) by 432 days.

(21) Appl. No.: 10/890,191

(22) Filed: Jul. 14, 2004

(65) Prior Publication Data

US 2005/0108247 A1    May 19, 2005

(51) Int. Cl.
G06F 17/30 (2006.01)
(52) U.S. Cl. .......................................... 707/10; 709/243
(58) Field of Classification Search ................... 707/10; 709/243
See application file for complete search history.

(56) References Cited

U.S. PATENT DOCUMENTS

| | | | |
|---|---|---|---|
| 5,724,575 A * | 3/1998 | Hoover et al. .................. 707/10 |
| 5,799,305 A * | 8/1998 | Bortvedt et al. ............... 707/10 |
| 5,815,649 A | 9/1998 | Friedman et al. |
| 6,430,527 B1 * | 8/2002 | Waters et al. .................. 703/3 |
| 7,069,295 B2 * | 6/2006 | Sutherland et al. ........... 709/203 |
| 2002/0147815 A1 | 10/2002 | Protassov et al. |
| 2003/0212863 A1 * | 11/2003 | Ganguly et al. ............. 711/118 |
| 2004/0215622 A1 * | 10/2004 | Dubnicki et al. ............. 707/10 |

FOREIGN PATENT DOCUMENTS

| WO | WO 02/065329 | 8/2002 |
|---|---|---|
| WO | WO 03/050707 | 6/2003 |
| WO | WO 03/052636 | 6/2003 |

OTHER PUBLICATIONS

A. Chandler et al., "Nevrlate: Scalable Resource Discovery", IEEE/ACM, 0-7695-1582-7/02, May 21-24, 2002, Berlin, Germany.

* cited by examiner

*Primary Examiner*—John E Breene
*Assistant Examiner*—Thu-Nguyet Le
(74) *Attorney, Agent, or Firm*—Stephen A. Bent; Phillip J. Articola; Foley & Lardner LLP (57) ABSTRACT

There is provided a distributed database system comprising a plurality of participating nodes mutually interconnected via a communication network. The participating nods include a first subset of storage nodes and a second subset of interfacing nodes. The storage nodes are grouped into a plurality of slots, each storage node having stored therein addresses of substantially al other storage nodes in its particular slot. The storage nodes of each slot further have stored therein one or more addresses of storage nodes in all other of the slots of the system. The interfacing nodes each have stored therein addresses of one or more of the storage nodes. The storage nodes are operable to store one or more data records therein and/or retrieve one or more data records therefrom in response to instructions received from the interfacing nodes. The system is coordinated in operation in a decentralised manner.

47 Claims, 3 Drawing Sheets

DISTRIBUTED DATABASE SYSTEM AND METHOD HAVING NODES CO-ORDINATED IN A DECENTRALIZED MANNER

FIELD OF THE INVENTION

The present invention relates to distributed database systems; for example, the present invention relates to a distributed database system arranged so as to provide enhanced data storing and searching performance. Moreover, the invention also relates to methods of storing and/or retrieving data in such a distributed database system.

BACKGROUND TO THE INVENTION

Distributed database systems are well known. The contemporary Internet is an example of a large-scale distributed database providing for both data storage and data retrieval. Intra-company database systems have been in use for many years, for example between regional offices of multinational companies.

In a published international PCT patent application no. PCT/US02/04349 (WO 02/065329), there is described a peer-to-peer storage system including a storage coordinator that centrally manages distributed resources in accordance with system policies administered through a central administrative console.

In a known contemporary large-scale distributed database system, several nodes are arranged to communicate mutually to form a dynamic cluster of nodes operable to handle database operations collectively. In such a cluster, each node is implemented in practice often as an end-user personal computer having executing thereon one or more database software programs. Moreover, the nodes are conveniently arranged to communicate over contemporary end-user Internet connections. Furthermore, there can often be more than a million nodes in such a cluster. Each node of the known database is susceptible to having stored therein some data records. These data records stored in the nodes of the network collectively form data of the database system.

In operation, each node of the database system is susceptible to issuing one or more search queries by communicating with other nodes, for example other nodes of the cluster. Nodes of the database system co-operate together in response to the one or more queries to locate collectively data records matching the one or more queries.

The inventors are aware of proprietary network architectures which have been proposed by third parties which are implemented in the form of distributed databases. Such proprietary architectures are known in association with trade mark names such as "Freenet", "Microsoft Peer-to-Peer Stack", "FastTrack" and "Kademlia".

The inventors have appreciated that there are several primary performance characteristics which are beneficially addressed when designing a large-scale distributed database system comprising a plurality of participating nodes.

A first performance characteristic is broad query functionality. Ideally, each data record in a distributed database system is denoted by one ore more key=value pairs. The database would thereby be operable to process queries like "find records where type=book and author contains 'john' and title begins with 'the adventures of' and price <50".

A second performance characteristic is short search time. Ideally, for example so that on-line users experience an effectively immediate response to their one or more queries, the database is arranged to deliver search responses to the on-line users in less than one second, for example 0.5 seconds.

A third performance characteristic is that the database is susceptible to being implemented whilst demanding a low communication bandwidth for its participating nodes. Typically, contemporary end-user Internet connections have asymmetrical bandwidth, for example an outbound bandwidth in the order of 64 kbit/sec which is much more limited than its corresponding inbound bandwidth in the order of at least 512 kbit/sec.

A fourth performance characteristic is fault-tolerance. In the database, there should arise little or no data loss or performance degradation in the database as a whole in a situation where a few of the nodes of the database fail in operation.

The inventors have therefore devised an alternative distributed database system distinguished from proprietary databases described in the foregoing, the alternative database system being designed taking the four performance characteristics into consideration.

SUMMARY OF THE INVENTION

A first object of the invention is to provide an alternative database system which is capable of providing a more advantageous compromise between the four performance characteristics elucidated in the foregoing.

A second object of the invention is to provide a nodal network including a more optimized allocation of nodal functions so that the network provides an enhanced database system.

According to a first aspect of the present invention, there is provided a distributed database system comprising a plurality of participating nodes and a communication network for supporting data transfer between the participating nodes, characterised in that the participating nodes include a first subset of storage nodes and a second subset of interfacing nodes, the storage nodes are operable to store one or more data records therein and/or retrieve one or more data records therefrom in response to instructions received from the interfacing nodes, the storage nodes are grouped into a plurality of slots, each storage node having stored therein addresses of substantially all other storage nodes in its particular slot, the storage nodes of each slot further have stored therein one or more addresses of storage nodes in other of the slots of the system, the interfacing nodes each have stored therein addresses of one or more of the storage nodes, the system being disposed such that its interfacing nodes each include at least one of:

(a) first computing means for analyzing data received thereat and for subsequently determining one or more of the slots corresponding to the received data, the system being operable to store the received data as corresponding data records in one or more of the storage nodes of said one or more of the slots corresponding to the received data; and (b) second computing means for analyzing one or more search queries and for determining one or more appropriate corresponding slots, for retrieving data records corresponding to the one or more search queries from one or more of the storage nodes of said one or more corresponding slots and for outputting one or more of the data records as multiple copies in a plurality of storage nodes in each of said one of more of the slots.

The invention is of advantage in that it is capable of providing a database system which is at least one of more rapid when searching for data, more robust and more efficient in its use of bandwidth.

Preferably, in the system, the participating nodes are operable to be co-ordinated in a decentralized manner.

Preferably, in the system, less than 10% of the participating nodes in the system are arranged to be storage nodes. More preferably, less than 2% of the participating nodes are arranged to be storage nodes. Most preferably, in the order of 0.5% of the participating nodes are arranged to be storage nodes. Beneficially, the storage nodes are provided with relatively wide bandwidth communication connections thereto.

In order to enhance robustness of the system and reduce the probability of data loss occurring therein, the system is preferably arranged so that, when storing one or more data records in one or more of the slots, one or more of the interfacing nodes are operable to store the one or more data records as multiple copies in a plurality of storage nodes in each of said one or more of the slots.

As a further measure to increase robustness of the system by circumventing excessive concentration of data in any particular node of the system, the plurality of storage nodes in which the multiple copies of the one or more data records are stored are preferably randomly selected by said one or more of the interfacing nodes. More preferably, to further increase robustness and reliability, said one or more interfacing nodes are arranged to store said multiple copies of said one or more data records at substantially different time instances to at least partially counteract loss of data records occurring in the system during operation.

In order to provide enhanced robustness and yet circumvent excess flow of data within the system, said one or more interfacing nodes are preferably arranged to store said multiple copies of said one or more data records repetitively at a time interval similar to an average time to failure of the participating nodes. Moreover, in order to reduce data concentrations at specific nodes, said one or more interfacing nodes are preferably arranged to store said multiple copies of said one or more data records in storage nodes which are randomly selected within each of said one or more of the slots each time data record storage is performed. More preferably, the time interval is in a range of 12 hours to 72 hours.

Operating efficiency of the system is dependent upon the number of storage nodes included within each slot. Therefore, to provide enhanced efficiency, each slot is preferably arranged to each include in a range of 2 to 1000 storage nodes. More preferably, each slot is arranged to each include in a range of 5 to 20 storage nodes.

Preferably, in order to provide for efficient storage node address identification when storing data records, the first computing means is operable to locate addresses of substantially all storage nodes in a selected slot by:
(a) requesting at least one of the storage nodes at random within the system to send to the first computing means one or more other storage node addresses stored therein corresponding to the selected slot; and
(b) requesting at least one of said one or more other storage nodes to send addresses of substantially all other storage nodes within the selected slot.

Similarly, for efficient storage node address identification when searching for data records in the system, the second computing means is preferably operable to locate addresses of substantially all storage nodes in a selected slot by:
(a) requesting at least one of the storage nodes at random within the system to send to the second computing means one or more other storage node addresses stored therein corresponding to the selected slot; and
(b) requesting at least one of said one or more other storage nodes to send addresses of substantially all other storage nodes within the selected slot.

Preferably, in the system, the first computing means is arranged to iterate over the data received thereat by applying a key=value transform wherein a parameter key corresponds to at least part of a word to be analyzed and a parameter value corresponds to an equivalent numerical value for the parameter key. Such a transform is capable of providing for efficient identification of slot numbers for data record storage purposes. More preferably, to provide for a more even distribution of data within the slots, a selection of the one or more appropriate corresponding slots to the parameter key is derived by applying a mathematical modulus function whose maximum value corresponds to the number of slots present within the system.

Preferably, in the system, the key=value transform is arranged to employ at least one of case folding and word sub-portion selection. More preferably, word sub-portion selection relates to selecting a front portion of a word to be analyzed. Yet more preferably, the length of the sub-portion selected for use is made dependent on an information content associated with the sub-portion.

Preferably, in the system, the second computing means is arranged to apply one or more of a key=value transform and a key =<phrase> transform for determining one or more appropriate corresponding slots to said one or more search queries.

In order to enable the system to cope with more general queries, when said one or more search queries are found to include an information content less than a predefined threshold, the second computing means is preferably operable to send the one or more search query to one or more randomly selected storage nodes.

In order to avoid data flow overload occurring in the system when searching for data records, the second computing means is operable to send said one or more search queries to corresponding storage nodes in sequential batches. More preferably, the second computing means is operable to send said one or more search queries in batches, such that each batch is arranged to be received by in a range of 1 to 50 storage nodes. Yet more preferably, each batch is received by 3 storage nodes (40).

According to a second aspect of the present invention, there is provided a method of operating a distributed database system, the method including steps of:
(a) arranging for the system to comprise a plurality of participating nodes and a communication network for supporting data transfer between the participating nodes, the participating nodes including a first subset of storage nodes and a second subset of interfacing nodes,
(b) grouping the storage nodes into a plurality of slots, each storage node having stored therein addresses of substantially all other storage nodes in its particular slot,
(c) arranging for the storage nodes of each slot further to have stored therein addresses of one or more storage nodes in other of the slots of the system,
(d) arranging for the interfacing nodes each to have stored therein addresses of one or more of the storage nodes,
(e) arranging for the storage nodes to store one or more data records therein and/or retrieve one or more data records therefrom in response to instructions received from the interfacing nodes,
(f) arranging for the system so that its interfacing nodes each include at least one of:
  (i) first computing means for analyzing data received thereat and for subsequently determining one or more of the slots corresponding to the received data, the system being operable to store the received data as corresponding data records in one or more of the storage nodes of said one or more of the slots corresponding to the received data; and (ii) second computing means for analyzing one or more search queries and for determining one or more appropriate corresponding slots, for retrieving data records corresponding to the one or more search queries from one or more of the storage nodes of said one or more corresponding slots and for outputting one or more of the data records in response to the one or more search queries.

Preferably, in the method, the participating nodes are operable to be coordinated in a decentralized manner.

Preferably, in the method, less than 10% of the participating nodes are arranged to be storage nodes. More preferably, less than 2% of the participating nodes are arranged to be storage nodes.

In order to enhance robustness of the method, when storing one or more data records in one or more of the slots, one or more of the interfacing nodes are operable to store the one or more data records as multiple copies in a plurality of storage nodes in each of said one or more of the slots. More preferably in the method, the plurality of storage nodes in which the multiple copies of the one or more data records are stored are randomly selected by said one or more of the interfacing nodes.

Preferably, in the method, said one or more interfacing nodes are arranged to store said multiple copies of said one or more data records at substantially different time instances to at least partially counteract loss of data records occurring in the system during operation. More preferably, said one or more interfacing nodes are arranged to store said multiple copies of said one or more data records repetitively at a time interval similar to an average time to failure of the participating nodes. Beneficially, the time interval is in a range of 12 hours to 72 hours. Yet more preferably, said one or more interfacing nodes are arranged to store said multiple copies of said one or more data records in storage nodes which are randomly selected within each of said one or more of the slots each time data record storage is performed.

Preferably, in the method, each slot is arranged to each include in a range of 2 to 1000 storage nodes. More preferably, each slot is arranged to each include in a range of 5 to 20 storage nodes.

Preferably, in the method, the first computing means is operable to locate addresses of substantially all storage nodes in a selected slot by:

(a) requesting at least one of the storage nodes at random within the system to send to the first computing means other storage node addresses stored therein; and
(b) requesting at least one of said one or more other storage nodes to send addresses of substantially all other storage nodes within its slot.

Preferably, in the method, the second computing means is operable to locate addresses of substantially all storage nodes in a selected slot by:

(a) requesting at least one of the storage nodes at random within the system to send to the second computing means other storage node addresses stored therein corresponding to the selected slot; and
(b) requesting at least one of said one or more other storage nodes to send addresses of substantially all other storage nodes within the selected slot.

Preferably, in the method, the first computing means is arranged to iterate over the data received thereat by applying a key=value transform wherein a parameter key corresponds to at least part of a word to be analyzed and a parameter value corresponds to an equivalent numerical value for the parameter key. More preferably, a selection of the one or more appropriate corresponding slots to the parameter key is derived by applying a mathematical modulus function whose maximum value corresponds to the number of slots present within the system. Yet more preferably, the key=value transform is arranged to employ at least one of case folding and word sub-portion selection. Beneficially, such word sub-portion selection relates to selecting a front portion of a word to be analyzed.

Preferably, in the method, to provide for more efficient slot identification, the length of the sub-portion selected for use is made dependent on an information content associated with the sub-portion.

Preferably, in the method, the second computing means is arranged to apply one or more of a key=value transform and a key =<phrase> transform for determining one or more appropriate corresponding slots to said one or more search queries.

Preferably, in the method, when said one or more search queries are found to include an information content less than a predefined threshold, the second computing means is operable to send the one or more search query to one or more randomly selected storage nodes.

Preferably, in the method, the second computing means is operable to send said one or more search queries to corresponding storage nodes in sequential batches. More preferably, the second computing means is operable to send said one or more search queries in batches, such that each batch is arranged to be received by in a range of 1 to 50 storage nodes. Yet more preferably, each batch is received by 3 storage nodes.

According to a third aspect of the invention, there is provided software conveyed by a communication network and/or stored on a data carrier for implementing the system according to the first aspect of the invention.

According to a fourth aspect of the invention, there is provided software conveyed by a communication network and/or stored on a data carrier for implementing the method according to the second aspect of the invention.

It will be appreciated that features of the invention are susceptible to being combined in any combination without departing from the scope of the invention.

DESCRIPTION OF THE DIAGRAMS

Embodiments of the invention will now be described, by way of example only, with reference to the following diagrams wherein.

DESCRIPTION OF EMBODIMENTS OF THE INVENTION

Figure 1:
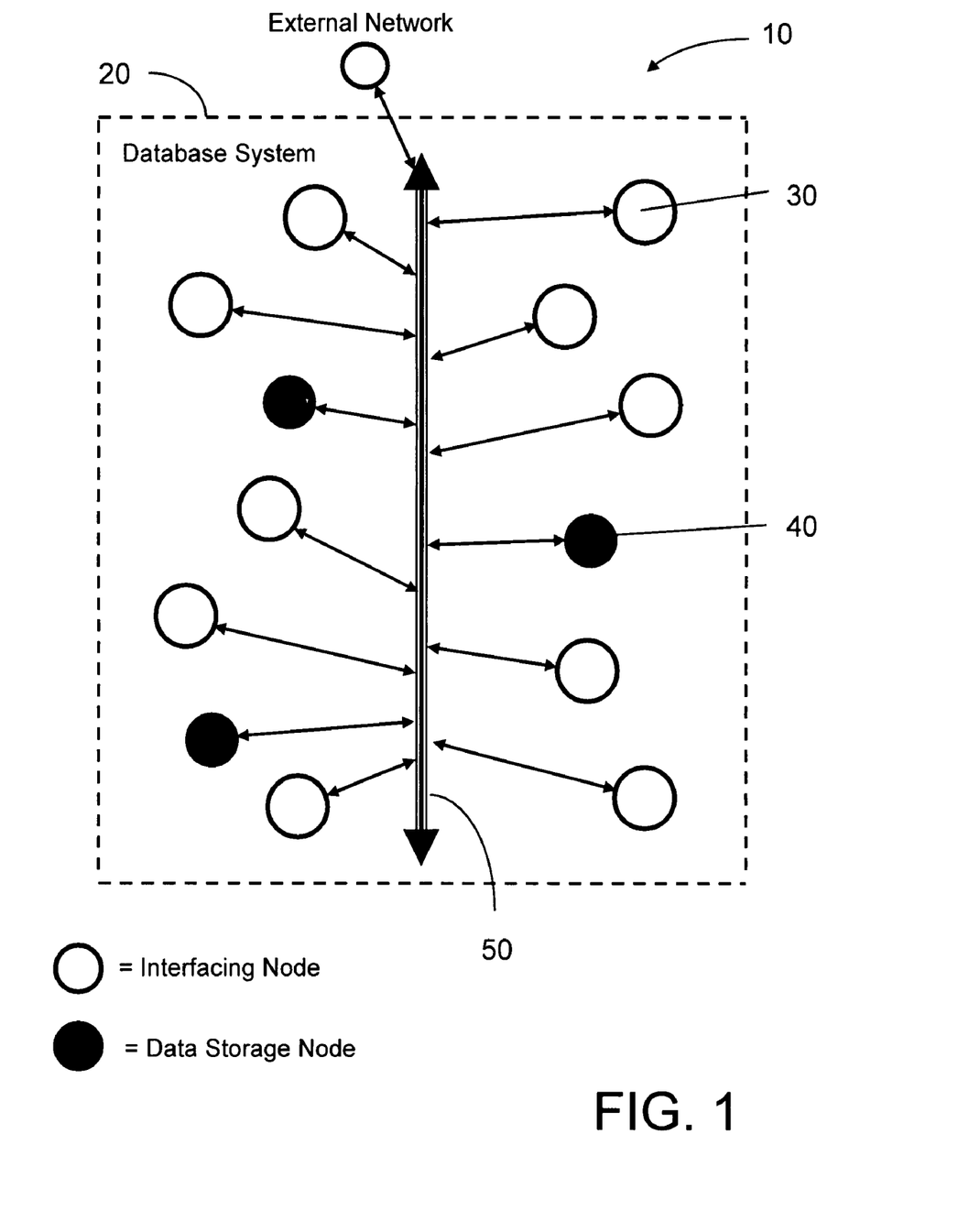
FIG. 1 is a schematic diagram of a distributed database system according to the invention.

Referring firstly to FIG. 1, there is shown a schematic representation of a distributed database system according to the invention; the database system is indicted generally by 10 and is included within a dashed line 20. The system 10 includes participating nodes, namely interfacing nodes represented as white circles, for example a node 30, and data storage nodes represented as black circles, for example a node 40. Preferably, the storage nodes 40 are a small minority of the participating nodes and are arranged to store database records. The storage nodes 40 of the subset are preferably selected according to first and second criteria; the first criterion is determined by bandwidth available within the database system 10, whereas the second criterion is determined by historical nodal reliability record. For example, a particular node of the database system 10 is selected to be a data storage node 40 if there are wide bandwidth links thereto and the particular node has earlier demonstrated itself to be sufficiently reliable when operating in the database system 10.

The system 10 further comprises data paths 50 through which the nodes 30, 40 are capable of mutually communicating. The communication paths 50 are preferably at least in part Internet connections. In practice, such data paths 50 comprise one or more of telephone lines, optical fiber communication links and wireless links. Thus, the data paths and the participating nodes function as a distributed system operating under decentralized control.

For example, in a distributed database system developed by the inventors, the system having a proprietary name "GI system", there are included typically in the order of 10 million participating nodes of which in the order of 50,000 nodes are allocated to be storage nodes 40, namely only 0.5% of the nodes are allocated to be storage nodes 40.

All participating nodes within the database system 10 are operable to send their data records and search enquiries to one or more of the storage nodes 40. Thus, the storage nodes 40 are operable to perform as search hubs where both data records and queries are concentrated. In consequence, each storage node 40 retains therein a portion of the database of the system 10.

In operation of the system 10, each storage node 40 is capable of rapidly searching its portion of the database to try to find records which match a given search query. However, on account of each storage node 40 storing only a small fraction of the total database, it is found by the inventors to be impractical to configure the system 10 such that queries are sent to every storage node 40 of the system 10.

The inventors have appreciated in designing the system 10 that a crucial aspect is how to arrange the system 10 so that a small number of particular storage nodes 40 which potentially have stored therein one or more data records that match a given query generated within the system 10 or received by the system 10 from an external network for example external users, connected thereto are susceptible to being rapidly identified. In order to address this aforementioned crucial aspect, the inventors have arranged the system 10 to employ a slot architecture which will now be elucidated in further detail.

In order to provide enhanced performance, the storage nodes 40 of the database system 10 are grouped into subsets hereinafter referred as "slots". Such grouping is not indicative of actual spatial location of the nodes 40 but rather their manner of connection within the system 10. In the system 10, the total number of slots present is preferably chosen so that each slot includes in a range of 5 to 20 storage nodes 40 therein. However, other numbers of storage nodes 40 in each storage slot can be selected if required.

Thus, in a version of the system 10 including 50,000 storage nodes 40, there are advantageously included 4096 slots wherein each such slot comprises in the order of 12 storage nodes 40. Conveniently, in the following description, slots are denoted by a #symbol; for example, the aforementioned 4096 slots are conveniently number #0 to #4095.

Figure 2:
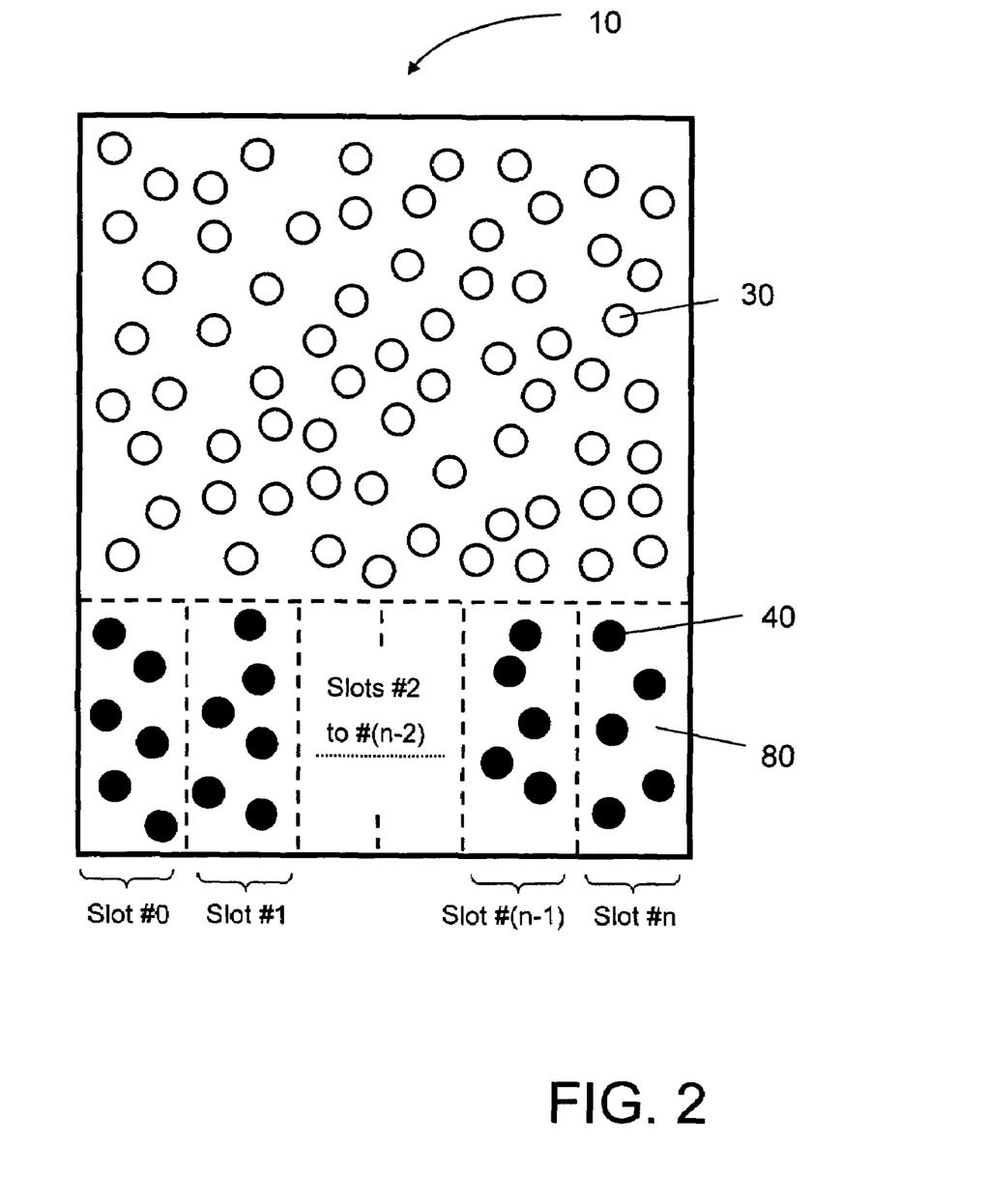
FIG. 2 is a schematic diagram of the system of FIG. 1 wherein slot architecture of the system is illustrated.

In FIG. 2, there is shown a representation of the system 10 wherein its storage nodes 40 are organised in slots, for example a slot 80.

The storage nodes 40 within each of the slots 80 are arranged to communicate closely with one another. Moreover, the storage nodes 40 of each slot 80 are arranged to store data such that there is significant overlap, for example duplication and/or redundancy, in the data records stored by the nodes 40. The system 10 employing slot 80 distribution of its storage nodes 40 is provided with operating software, also referred to as GI network organization algorithms, which is functional to ensure that:

(a) each interfacing node 30 is provided with addresses, for example Internet addresses where the system 10 is implemented in an Internet context, of several storage nodes 40 included in the system 10;

(b) each storage node 40 is provided with addresses of several storage nodes 40 in each of the slots 80 included in the system 10; and (c) each storage node 40 is provided with addresses of all other storage nodes 40 within its own slot 80.

Figure 3:
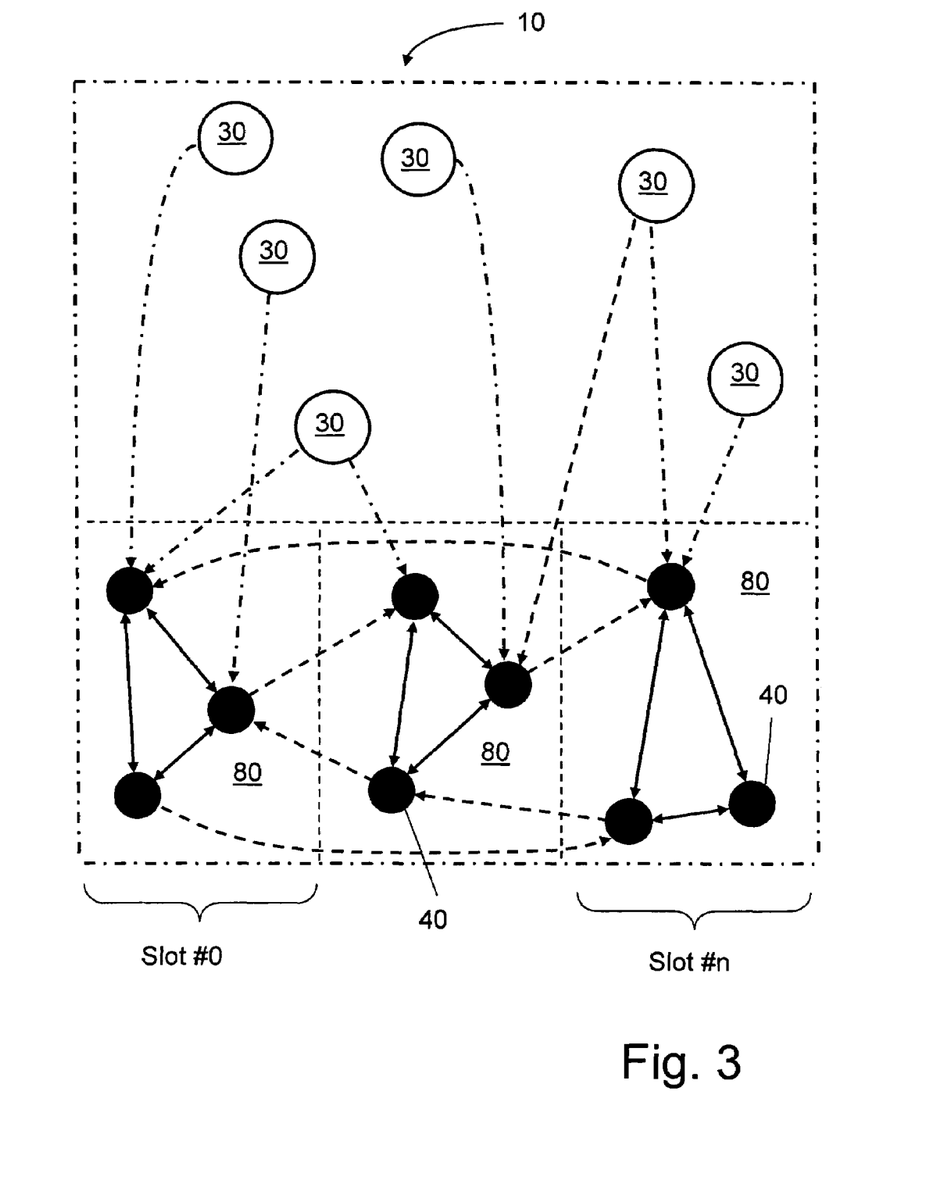
FIG. 3 is a schematic diagram of address structure within the system of FIG. 1.

Such an address structure is illustrated schematically in FIG. 3 wherein inter-nodal address links are denoted by arrows.

Each node 30, 40 in the system 10 is operable to be able to locate the addresses of some storage nodes 40 in at least one of the slots 80 of the system 10 by asking a storage node 40 selected at random. Such request of address information is susceptible to requiring as much time as one network round-trip.

Thus, a method of locating the addresses of all storage nodes 40 in a particular slot 80 from one of the interfacing nodes 30 in the system 10 involves the interfacing node 30 executing the following steps:

(i) requesting one of the storage nodes 40 selected at random to provide storage node 40 addresses therefrom corresponding to the particular slot 80; and (ii) requesting at least one of the storage nodes 40 whose addresses were provided to the interfacing node 30 in step (i) for all addresses of storage nodes 40 in the particular slot 80.

Preferably, in step (ii), all of the storage nodes 40 whose addresses were provided in step (i) are requested to respond with all addresses of storage nodes 40 in their respective slots 80.

The method comprising steps (i), (ii) requires two network round-trips for its execution.

The method of locating the addresses is illustrated schematically in FIG. 4 in the form of a flow chart whose nomenclature is as provided in Table 1. The previous operation (PO) is designated by label 400, Step 1 is designated by label 410. Step 2 is designated by label 420, Step 3 is designated by label 430, Step 4 is designated by label 440, Step 5 designated by label 450, and the next operation (NO) is designated by label 460.

TABLE 1

|  | Previous operation |
|---|---|
| STEP 1 | Identify desired slot 80 (for example, from key = value relationship |
| STEP 2 | Select a first storage node 40 at random |
| STEP 3 | Contact first storage node 40 and request addresses of other storage nodes 40 stored in the first node 40 including second storage node 40 in desired slot 80 |
| STEP 4 | Contact second storage node 40 in desired slot 80 |
| STEP 5 | Receive from second storage node 40 addresses of all storage nodes 40 included in the desired slot 80 |
|  | Next operation |

A simple example is susceptible to further elucidate operation of the system 10. The system 10 includes, amongst other interfacing nodes 30 and storage nodes 40, four storage nodes 40 designated as nodes A, B, C and D. In the example, the storage nodes A, B, C, D are included within slots #22, #77, #77, #55 respectively. Moreover, the storage node A has stored therein the addresses of the storage nodes B, D. Likewise, the storage node B has stored therein the address of the storage node C. Similarly, the storage node C has the address of the storage node B stored therein because both the nodes B, C are in the same slot #77. Furthermore, the storage node D has no other addresses stored therein.

In the simple example, another node E of the system 10 is desirous to receive all the addresses of nodes in the slot #77. The node E selects one of the four nodes A, B, C, D at random and happens in this example to select node A. The node E then proceeds to interrogate the node A for the addresses of any storage nodes 30 in the slot #77 that it knows. In response, the node A sends the address of the node B as this is the only storage node which the storage node A knows. The node E then proceeds to interrogate the node B for the addresses of all other nodes in the slot #77; in response, the node B sends to the node E the address of the node C. In such a two-stage process, the node E receives the addresses of all the storage nodes in the slot #77, namely the storage nodes B, C. Note that node A when interrogated by node E is preferably operable to send only the addresses of any storage nodes it knows in the slot #77 and not other node addresses it knows. The rationale of such an approach is to result in the enquiry from the node E not requiring more system 10 capacity than absolutely necessary.

It will be appreciated that more complex examples of the system 10 than the nodes A, B, C, D described in the foregoing can be generated to illustrate operation of the system 10.

Hence, in devising the system 10, the inventors have further appreciated that it is desirable in the system 10 to have a limited number of storage node 40 addresses cached in each storage node 40 for reducing the number of network round-trips required.

In the foregoing, an address architecture for the system 10 is described. In the following, operation of the system 10 when sending data records to one or more of the storage nodes 40 will be described.

As described in the foregoing, all the interfacing nodes 30 are operable to send their data records to one or more of the storage nodes 40 according to a storage method. When sending its data to one of the storage nodes 40 according to the storage method, the interfacing node 30 firstly selects, based on the particular data record, one or more appropriate slots 80. The interfacing node 30 then secondly locates the addresses of storage nodes 40 in these one or more appropriate slots 40. Then, the interfacing node 30 thirdly sends the data records to several randomly selected storage nodes 40 in the selected slots 80, for example to 3 to 5 storage nodes 40 in each of the selected slots 80.

The method of locating the addresses is illustrated schematically in FIG. 4 in the form of a flow chart whose nomenclature is as provided in Table 1. The previous operation (PO) is designated by label 400. Step 1 is designated by label 410, Step 2 is desianated by label 420. Step 3 is designated by label 430. Step 4 is designated by label 440, Step 5 is designated by label 450, and the next operation (NO) is designated by label 460.

The method of locating the addresses is illustrated schematically in FIG. 5 in the form of a flow chart whose nomenclature is as provided in Table 2. The previous operation (PO) is desianated by label 500, Step A is designated by label 510. Step B is designated by label 520, Step C is designated by label 530, Step D is designated by label 540, Step E is designated by label 550, and the next operation (NO) is designated by label 560.

TABLE 2

| | |
|---|---|
| | Previous operation |
| STEP A | Receive data to be stored as a data record in the system 10 |
| STEP B | Evaluate suitable desired slot 80 for receiving the data record to be stored (for example, from key = value pair calculation) |
| STEP C | Locate addresses of storage nodes 40 in desired slot 80 (see FIG. 4 method) |
| STEP D | Randomly select several storage nodes 40 in desired slot 80 |
| STEP E | Store data record in the several selected storage nodes 40 of the desired slot 80 |
| | Next operation |

In the storage method, the slots 80 for a given data record are chosen by iterating over all key=value pairs of the record; the slots 80 identified are then combined. Thus, each key=value pair is susceptible to generating zero or more slot 80 # numbers according to a slot identifying method including steps as follows:

(a) evaluating a key=value pair for generating an integer value resulting in one slot number from "value mod number_of_slots" where 'mod' is a mathematical modulus function; for example, a key=value pair such as "price=5000" generates a slot 80 number #904 assuming there are 4096 slots as described in the foregoing as an example; and (b) arranging for text values in step (a) to generate one slot 80 number for each word input to a key=value pair.

The slot identifying method is preferably arranged so that a slot number for a word is calculated as a hash # value derived from first few characters of the word, namely from a front sub-portion of the word. For example, a word "explanation" has associated therewith a front sub-portion "explan". Preferably, when determining a corresponding hash # value, case-folding and other similar normalizations are employed. The number of letter characters included in the front sub-portion is preferably chosen based on information content of the word text. For example, a word "Xenon" with associated front sub-portion "xen" will have associated therewith a greater information content than the word "explanation" with front sub-portion "exp"; the front sub-portion "exp" is likely to be too short and lacking in information content to be suitable for searching purposes. Similarly, in a word "xzaucha", it is only required to include the letters "xz" in the corresponding front sub-portion because this letter pair is uncommon and therefore has associated therewith a high information content; such a short sub-portion is potentially suitable for searching purposes because of its high information content. Moreover, in the word "inaugural", as many letters as "inaug" may be required to ensure sufficient information content for searching purposes within the system 10. Further considering these examples, it will be appreciated that words "xzaucha", "Xzerb" and "XZ" will result in similar slot 80 numbers being generated, for example a slot #145. Likewise, the words "inaugural" and "INAUGURATED" will result in similar slot 80 numbers being generated, for example a slot #3942. Such a word/slot value mapping is known as a "word_to_slot" algorithm having a word input to provide an argument.

Algorithms suitable for handling numerical expressions, for example binary numbers, are susceptible to being generated in a similar manner, wherein they give rise to a corresponding front sub-portion. As an alternative to front sub-portion, rear- and middle-sub-portions can additionally or alternatively be employed for one or more of word and numerical expressions to be searched within the system 10.

Thus, given that a data record has at least some non-trivial key=value pairs, the data record will be sent to at least one of the slots 80 in the system 10. In practice, many data records will be sent to more than one slot 80 for storage purposes in order to provide data record redundancy as elucidated earlier.

The storage of data record within the database system 10 has just been described in the foregoing. Of similar importance, there arises a need to process search queries within the system 10 for accessing stored data records. The system 10 is arranged to employ a searching method as will now be described in greater detail.

In the searching method, an interfacing node 30 issues a search query to the system 10, namely to one or more storage nodes 40 in one particular slot 80. Moreover, in the searching method, an appropriate slot 80 number is calculated based on the search enquiry. The object of the searching method is to find a slot 80 number that has been previously obliged by the system 10 to store data records corresponding to the search query. For example, from above, all data records corresponding to a phrase "title contains Inaugural" will have been sent to a slot 80 having a hash number #3942.

Search queries entered into the system 10 comprise one or more terms, and a data record is deemed to correspond to a query if the data record matches all terms generated from the query. Therefore, at an interfacing node 30 receiving a query, in order to find a suitable slot 80 to send a query to, the interfacing node 30 is operable to iterate over text terms provided in the query until it finds a term giving rise to a corresponding slot 80 hash number reference. In the interfacing node 30, a text term is susceptible to resulting in at least one slot 80 hash number reference being identified when any one of the following conditions are satisfied:

(a) in determining a key=value pair, it is found that a "key =<integer>" pair is found, in which case a corresponding slot hash number # is determined in an exactly similar manner as described in the foregoing when sending data records to one or more of the storage nodes 40;

(b) in determining a key=value pair, it is found that a "key =<phrase>" term is found or a "key contains <phrase>" term is found; in such a situation, an appropriate slot 80 hash number # is obtained by applying the word_to_slot algorithm as elucidated in the foregoing; and/or (c) in determining a key=value pair, it is found that a "key begins with <word>" term and the <word> information includes enough characters to specify an appropriate slot 80 by applying the aforementioned word_to_slot algorithm.

In operating software executing in the system 10, conditions additional to (a) to (c) above for other terms may be added provided that a slot number is produced only if it is evident that any matching data record must have been sent to one or more of the slots 80.

In the searching method, if a slot number # is identified, the query is sent to storage nodes 40 in this slot. If all matching records are desired, the query is sent to all storage nodes 40 in the system 10. Conversely, if only some matching records are desired, the query is sent to storage nodes 40 successively, one storage node 40 at a time, until enough matching records are obtained. Such successive storage node 40 interrogation saves some network bandwidth with regard to the storage nodes 40, but increases search time; there is therefore a trade-off between bandwidth usage and search exhaustiveness that depends on the needs of particular searches.

For reasonably specific search queries, one of the conditions (a) to (c) generates in practice an appropriate slot number #. However, for search queries, the conditions (a) to (c) are often unsuccessful at generating a slot number #; for example, a query "price >10 and author begins with a" is susceptible to generating no slot number #. In order that the system 10 is capable of usefully coping with such non-specific queries, an alternative strategy is adopted, namely the query is sent to one or more randomly selected slot numbers # and processed therein to try to identify matching data record. The rationale in such a random approach is that such queries would seem to be very general queries, and a relatively large percentage of data records in the system 10 match the queries. For example, if there are 4096 slots and the query is matched by 1/4096, namely 0.024%, of the records, then sending the query to one randomly selected slot is effective. Sending the query to more than one slot 80 is possible within the system 10, but represents a trade-off between bandwidth usage and search exhaustiveness.

In practice, sending one or more general queries to all slots 80 is usually prohibitive in terms of bandwidth usage within the system 10, therefore the aforementioned random slot approach adopted for general queries is not susceptible to obtaining all data records matching the one or more general queries. In this respect, the system 10 is relatively inefficient in operation. Some search queries for which no slot numbers # are identified are, subsequently, found to be quite specific enquiries and are not matched by a significant percentage of data records. The system 10 is operable to send such enquiries to one or more randomly selected slots 80, but matching records are usually not found thereat because such random selection has not identified a correct slot 80.

Regarding next an issue of reliability of the system 10 in operation, since there are in a range of 5 to 20 storage nodes 40 in each slot 80, it is extremely unlikely that all the storage nodes 40 in any one slot fail simultaneously.

The inventors have found that, on average, a storage node 40 is functional for a period in a range of 12 to 72 hours before it fails or switches off-line. When a storage node 40 failure occurs, network organizing algorithms executing within the system 10 are operable to assign a new storage node 40 to replace the failed storage node 40 within the same slot 80. The new storage node 40 is not able to take over from the failed node 40, since stored data is unavailable from the failed node 40. Instead, the new storage node 40 starts as empty and only gradually thereafter obtains a portion of the database as interfacing nodes 30 send data records to the new storage node 40. Thus, there is no immediate replication of data records from one storage node 40 to another, because such immediate replication would increase bandwidth requirements within the system 10 and is susceptible to resulting in chaotic behaviour within the system 10.

As described in the foregoing, each data record is stored in more than one storage node 40; in consequence, a single storage node 40 failure does not constitute a loss of this data record in the system 10 as a whole. When numerous of the storage nodes 40 progressively fail, when all storage nodes 40 storing a given data record fail, this data record is lost to the system 10. Such progressive failure would be a significant data drain to the system 10, with a data record lifetime being in the order of 12 to 72 hours, were it not for the inventors including countermeasures within the system 10. In one of the countermeasures, the interfacing nodes 30 are arranged to repeat periodically the process of sending their data records to storage nodes 40, selecting storage nodes 40 randomly in the same slots 80 each time data records are stored. Preferably, the time period for such repetitive data storage is comparable to the average storage node operational lifetime between failures, namely in a range of 12 to 72 hours. Such repeated storage of data records has been shown by the inventors to result statistically in a high probability that there is at least one functional storage node 40 within the system 10 storing a particular data record provided that the interfacing node 30 giving rise to the data record continues to remain functional.

In most contemporary databases, it is found in operation that only a subset of matching data records identified in response to one or more queries is desired. Thus, assuming that local processing such as processing queries in ordinary nodes 30 and matching queries in the storage nodes 40 takes a negligible amount of time, the inventors have appreciated that a primary factor affecting search time within the system 10 is the number of network round-trips required to process a query.

In the foregoing, it will be appreciated that most search queries are sent to one slot 80 for one or more corresponding data records to be identified and sent therefrom in response. The number of storage nodes 40 to which the queries are sent is dependent in the system 10 on a trade-off between searching time and bandwidth of the system 10. In a typical application of the system 10, a given searching query is sent to storage nodes 40 in batches of three nodes 40 until enough results have been obtained in response to the given query.

Preferably, 2 batches of the given query are sent resulting in 6 storage nodes 40 being contacted; on average, sending these two batches is found to be sufficient on average to generate desired data records. In additional, as elucidated in the foregoing, one round-trip is required for looking up storage node 40 addresses, yielding a total of 3 network round-trips to complete a given 2-batch searching query. In practice, such three round-trips corresponds to a search query response time to users at the interfacing nodes 30 in the order of 1 second which is perceived by users of the system 10 to be substantially instantaneous.

In many circumstances, an interfacing node 30 has already cached addresses of storage nodes 40 in a given slot 80 and enough search results are obtained in the first batch of storage nodes 40 queried based on the cached addresses; in consequence, such a search involves one network round-trip which is substantially ideal and is not susceptible to being improved upon in any alternative design for a distributed database system.

The system 10 is of benefit in that data record searching time therein is not influenced by the number of slots 80 included or nodes 30, 40 in the system 10. Thus, searching the system 10 implemented as a 100 million-node database is substantially as fast as searching the system 10 implemented with 1000 participating nodes.

Implicit from the foregoing description of the system 10 is that it is implemented using software. This software is preferably conveyed to users of the system 10 by at least one of:
(a) communicating the software to the users via the data communication paths 50 as data, for example as an e-mail attachment; and
(b) communicating the software to the users by way of storing the software as data on a suitable data carrier, for example by way of a contemporary CD ROM.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention. It will be appreciated that modifications can be made to embodiments of the invention described in the foregoing without departing from the scope of the invention.

In the foregoing, use of expressions such as "comprise", "include", "incorporate", "is", "are", "have", "contain" are not intended to be exclusive, namely such expressions are to be construed to allow other unspecified items also to be present. Reference to the singular is to include reference to the plural and vice versa. In the accompanying claims, numerals included within parentheses are for assisting understanding of the claims and are not intended to influence claim scope.

We claim:

1. A distributed database system comprising a, plurality of participating nodes and a communication network for supporting data transfer between the participating nodes, comprising:
   the participating nodes comprise a first subset of storage nodes and a second subset of interfacing nodes,
   the storage nodes each including a processor and a memory and are operable to store one or more data records therein and/or retrieve one or more data records therefrom in response to instructions received from the interfacing nodes,
   the storage nodes are grouped into a plurality of slots, each storage node having stored therein addresses of substantially all other storage nodes in its particular slot,
   the storage nodes of each slot further have stored therein one or more addresses of storage nodes in other of the slots of the system,
   the interfacing nodes each including a processor and a memory and have stored therein addresses of one or more of the storage nodes,
   the participating nodes being operable to be co-ordinated in a decentralized manner at a node level, wherein each of the participating nodes selects, on its own and without any input from other nodes, which of the storage nodes to output data thereto,
   the processor of each of the interfacing nodes comprising:
   (a) a first analyzing unit configured to analyze data received thereat and for subsequently determining one or more of the slots corresponding to the received data, the system being operable to store the received data as corresponding data records in one or more of the storage nodes of said one or more of the slots corresponding to the received data; and
   (b) a second analyzing unit configured to analyze one or more search queries and for determining one or more appropriate corresponding slots, for retrieving data records corresponding to the one or more search queries from one or more of the storage nodes of said one or more corresponding slots and for outputting one or more of the data records in response to the one or more search queries.

2. A system according to claim 1, wherein less than 10% of the participating nodes are arranged to be storage nodes.

3. A system according to claim 1, wherein less than 2% of the participating nodes are arranged to be storage nodes.

4. A system according to claim 1, wherein, when storing one or more data records in one or more of the slots, one or more of the interfacing nodes are operable to store the one or more data records as multiple copies in a plurality of storage nodes in each of said one or more of the slots.

5. A system according to claim 4, wherein the plurality of storage nodes in which the multiple copies of the one or more data records are stored are randomly selected by said one or more of the interfacing nodes.

6. A system according to claim 4, wherein said one or more interfacing nodes are arranged to store said multiple copies of said one or more data records at substantially different time instances to at least partially counteract loss of data records occurring in the system during operation.

7. A system according to claim 6, wherein said one or more interfacing nodes are arranged to store said multiple copies of said one or more data records repetitively at a time interval similar to an average time to failure of the participating nodes, so as to maintain data storage integrity in the system even in the event of failure of a plurality of the participating nodes.

8. A system according to claim 7, wherein said one or more interfacing nodes are arranged to store said multiple copies of said one or more data records in storage nodes which are randomly selected within each of said one or more of the slots each time data record storage is performed.

9. A system according to claim 7, wherein the time interval is in a range of 12 hours to 72 hours.

10. A system according to claim 1, wherein each slot is arranged to each include in a range of 2 to 1000 storage nodes.

11. A system according to claim 1, wherein each slot is arranged to each include in a range of 5 to 20 storage nodes.

12. A system according to claim 1, wherein the first computing means is operable to locate addresses of substantially all storage nodes in a selected slot by:
   (a) requesting at least one of the storage nodes at random within the system to send to the first computing means one or more other storage node addresses stored therein corresponding to the selected slot; and
   (b) requesting at least one of said one or more other storage nodes to send addresses of substantially all other storage nodes within the selected slot.

13. A system according to claim 1, wherein the second computing means is operable to locate addresses of substantially all storage nodes in a selected slot by:
   (a) requesting at least one of the storage nodes at random within the system to send to the second computing means one or more other storage node addresses stored therein corresponding to the selected slot; and
   (b) requesting at least one of said one or more other storage nodes to send addresses of substantially all other storage nodes within the selected slot.

14. A system according to claim 1, wherein the first computing means is arranged to iterate over the data received thereat by applying a key=value transform wherein a parameter key corresponds to at least part of a word to be analysed and a parameter value corresponds to an equivalent numerical value for the parameter key.

15. A system according to claim 13, wherein a selection of the one or more appropriate corresponding slots to the parameter key is derived by applying a mathematical modulus function whose maximum value corresponds to the number of slots present within the system.

16. A system according to claim 14, wherein the key=value transform is arranged to employ at least one of case folding and word sub-portion selection.

17. A system according to claim 16, wherein word sub-portion selection relates to selecting a front portion of a word to be analysed, and wherein a slot number for the word to be analyzed is calculated as a hash value derived from the front portion of the word to be analyzed.

18. A system according to claim 16, wherein the length of the sub-portion selected for use is made dependent on an information content associated with the sub-portion.

19. A system according to claim 1, wherein the second computing means is arranged to apply one or more of a key=value transform and a key =<phrase> transform for determining one or more appropriate corresponding slot to said one or more search queries.

20. A system according to claim 19, wherein, when said one or more search queries are found to include an information content less than a predefined threshold, the second computing means is operable to send the one or more search query to one or more randomly selected storage nodes.

21. A system according to claim 19, wherein the second computing means is operable to send said one or more search queries to corresponding storage nodes in sequential batches.

22. A system according to claim 21, wherein the second computing means is operable to send said one or more search queries in batches, such that each batch is arranged to be received by in a range of 1 to 50 storage nodes.

23. A system according to claim 22, wherein each batch is received by 3 storage nodes.

24. A method of operating a distributed database system, the method comprising the steps of:
   (a) arranging for the system to comprise a plurality of participating nodes and a communication network for supporting data transfer between the participating nodes, the participating nodes comprising a first subset of storage nodes and a second subset of interfacing nodes,
   (b) grouping the storage nodes into a plurality of slots, each storage node having stored therein addresses of substantially all other storage nodes in its particular slot,
   (c) arranging for the storage nodes of each slot further to have stored therein addresses of one or more storage nodes in other of the slots of the system,
   (d) arranging for the interfacing nodes each to have stored therein addresses of one or more of the storage nodes,
   (e) arranging for the storage nodes to store one or more data records therein and/or retrieve one or more data records therefrom in response to instructions received from the interfacing nodes,
   (f) arranging for the system so that its interfacing nodes each comprise at least one of:
   (i) analysing data received thereat and for subsequently determining one or more of the slots corresponding to the received data, the system being operable to store the received data as corresponding data records in one or more of the storage nodes of said one or more of the slots corresponding to the received data; and
   (ii) analysing one or more search queries and for determining one or more appropriate corresponding slots, for retrieving data records corresponding to the one or more search queries from one or more of the storage nodes of said one or more corresponding slots and for outputting one or more of the data records in response to the one or more search queries, wherein the participating nodes are operable to be co-ordinated in a decentralized manner at a node level wherein each of the participating nodes selects, on its own and without any input from other nodes, which of the storage nodes to output data thereto.

25. A method according to claim 24, wherein less than 10% of the participating nodes are arranged to be storage nodes.

26. A method according to claim 24, wherein less than 2% of the participating nodes are arranged to be storage nodes.

27. A method according to claim 24, wherein, when storing one or more data records in one or more of the slots, one or more of the interfacing nodes are operable to store the one or more data records as multiple copies in a plurality of storage nodes in each of said one or more of the slots.

28. A method according to claim 27, wherein the plurality of storage nodes in which the multiple copies of the one or more data records are stored are randomly selected by said one or more of the interfacing nodes.

29. A method according to claim 27, wherein said one or more interfacing nodes are arranged to store said multiple copies of said one or more data records at substantially different time instances to at least partially counteract loss of data records occurring in the system during operation, so as to maintain data storage integrity in the system even in the event of failure of plurality of the participating nodes.

30. A method according to claim 29, wherein said one or more interfacing nodes are arranged to store said multiple copies of said one or more data records repetitively at a time interval similar to an average time to failure of the participating nodes.

31. A method according to claim 30, wherein said one or more interfacing nodes are arranged to store said multiple copies of said one or more data records in storage nodes which are randomly selected within each of said one or more of the slots each time data record storage is performed.

32. A method according to claim 30, wherein the time interval is in a range of 12 hours to 72 hours.

33. A method according to claim 24, wherein each slot is arranged to each include in a range of 2 to 1000 storage nodes.

34. A method according to claim 24, wherein each slot is arranged to each include in a range of 5 to 20 storage nodes.

35. A method according to claim 24, wherein the first computing means is operable to locate addresses of substantially all storage nodes in a selected slot by:
  (a) requesting at least one of the storage nodes at random within the system to send to the first computing means other storage node addresses stored therein corresponding to the selected slot; and
  (b) requesting at least one of said one or more other storage nodes to send addresses of substantially all other storage nodes within the selected slot.

36. A method according to claim 24, wherein the second computing means is operable to locate addresses of substantially all storage nodes in a selected slot by:
  (a) requesting at least one of the storage nodes at random within the system to send to the second computing means other storage node addresses stored therein corresponding to the selected slot; and
  (b) requesting at least one of said one or more other storage nodes to send addresses of substantially all other storage nodes within the selected slot.

37. A method according to claim 24, wherein the first computing means is arranged to iterate over the data received thereat by applying a key=value transform wherein a parameter key corresponds to at least part of a word to be analysed and a parameter value corresponds to an equivalent numerical value for the parameter key.

38. A method according to claim 37, wherein a selection of the one or more appropriate corresponding slots to the parameter key is derived by applying a mathematical modulus function whose maximum value corresponds to the number of slots present within the system.

39. A method according to claim 37, wherein the key=value transform is arranged to employ at least one of case folding and word sub-portion selection.

40. A method according to claim 39, wherein word sub-portion selection relates to selecting a front portion of a word to be analysed, and wherein a slot number for the word to be analyzed is calculated as a hash value derived from the front portion of the word to be analyzed.

41. A method according to claim 39, wherein the length of the sub-portion selected for use is made dependent on an information content associated with the sub-portion.

42. A method according to claim 24, wherein the second computing means is arranged to apply one or more of a key=value transform and a key =<phrase> transform for determining one or more appropriate corresponding slot to said one or more search queries.

43. A method according to claim 41, wherein, when said one or more search queries are found to include an information content less than a predefined threshold, the second computing means is operable to send the one or more search query to one or more randomly selected storage nodes.

44. A method according to claim 42, wherein the second computing means is operable to send said one or more search queries to corresponding storage nodes in sequential batches.

45. A method according to claim 44, wherein the second computing means is operable to send said one or more search queries in batches, such that each batch is arranged to be received by in a range of 1 to 50 storage nodes.

46. A method according to claim 44, wherein each batch is received by 3 storage nodes.

47. A data carrier having stored on it software implementing the method according to claim 24.

* * * * *